United States Patent
Cozens et al.

(10) Patent No.: US 12,391,372 B2
(45) Date of Patent: Aug. 19, 2025

(54) AIRCRAFT SYSTEM

(71) Applicants: AIRBUS OPERATIONS LIMITED, Bristol (GB); AIRBUS OPERATIONS (S.A.S.), Toulouse (FR)

(72) Inventors: Simon John Cozens, Bristol (GB); Fernando Izquierdo Civera, Bristol (GB); Nicholas Elliott, Bristol (GB); Daren Payne, Bristol (GB); Livier Ben, Bristol (GB); Julien Decronsonniere, Bristol (GB); James Cullingham, Bristol (GB)

(73) Assignees: AIRBUS OPERATIONS LIMITED, Bristol (GB); AIRBUS OPERATIONS (S.A.S.), Toulouse (FR)

( * ) Notice: Subject to any disclaimer, the term of this patent is extended or adjusted under 35 U.S.C. 154(b) by 516 days.

(21) Appl. No.: 17/679,541

(22) Filed: Feb. 24, 2022

(65) Prior Publication Data
US 2022/0274690 A1 Sep. 1, 2022

(30) Foreign Application Priority Data
Feb. 26, 2021 (GB) .................................... 2102827

(51) Int. Cl.
*B64C 25/16* (2006.01)
*B64C 25/28* (2006.01)

(52) U.S. Cl.
CPC ............. *B64C 25/28* (2013.01); *B64C 25/16* (2013.01)

(58) Field of Classification Search
CPC ......... B64C 25/28; B64C 25/16; B64C 13/16; B64C 25/26; B64C 25/10
See application file for complete search history.

(56) References Cited

U.S. PATENT DOCUMENTS

| 6,854,689 B1 | 2/2005 | Lindahl et al. |
| 6,880,784 B1 * | 4/2005 | Wilkinson ........... G05D 1/0072 |
| | | 244/76 R |

(Continued)

FOREIGN PATENT DOCUMENTS

| CN | 107226199 | * 10/2017 | ............. B64C 25/10 |
| CN | 112253319 | * 1/2021 | |

(Continued)

OTHER PUBLICATIONS

CN112253319 machine translation (Year: 2021).*

(Continued)

*Primary Examiner* — Anne Marie Antonucci
*Assistant Examiner* — Jingli Wang
(74) *Attorney, Agent, or Firm* — Nixon & Vanderhye P.C.

(57) ABSTRACT

An aircraft system for an aircraft, the aircraft system including a controller configured, during a take-off procedure, to determine that a one engine inoperative condition is met and determine that a predetermined take-off criterion is met. The controller is configured, on the basis of a determination that the one engine inoperative condition is met, and prior to receiving a command to retract a landing gear of the aircraft, to initiate automatic opening of a landing gear bay door associated with the landing gear from a closed position towards an open position when the controller determines that the predetermined take-off criterion is met, and inhibit the automatic opening when the controller determines that the predetermined take-off criterion is not met.

20 Claims, 4 Drawing Sheets

(56) References Cited

U.S. PATENT DOCUMENTS

| | | | |
|---|---|---|---|
| 9,517,837 | B2 | 12/2016 | Lecourtier |
| 10,302,451 | B1 * | 5/2019 | Kim .................... G01C 23/005 |
| 2011/0066306 | A1 * | 3/2011 | Berthereau ............ B64C 13/16 |
| | | | 701/15 |
| 2020/0407047 | A1 * | 12/2020 | Kerr ......................... B64C 9/00 |

FOREIGN PATENT DOCUMENTS

| | | |
|---|---|---|
| EP | 3 725 678 | 10/2020 |
| GB | 2563437 | 12/2018 |
| GB | 2587205 | 3/2021 |
| WO | 2019/166461 | 9/2019 |

OTHER PUBLICATIONS

CN 107226199 machine translation (Year: 2017).*
Combined Search and Examination Report for GB2102827.9 dated Oct. 29, 2021, 11 pages.

* cited by examiner

AIRCRAFT SYSTEM

RELATED APPLICATION

This application incorporates by reference and claims priority to United Kingdom patent application GB2102827-9, filed Feb. 26, 2021.

TECHNICAL FIELD

The present invention relates to an aircraft system for an aircraft, to a method of operating a controller of an aircraft system of an aircraft during a take-off procedure, and to an aircraft.

BACKGROUND

In some known aircraft, a landing gear of the aircraft is held in an extended position when the aircraft is on the ground and is retracted to a stowed position once the aircraft has taken off. Movement of the landing gear between the extended position and the stowed position is typically controlled by a pilot using cockpit controls of the aircraft, such as a landing gear lever. In several of these known aircraft, a landing gear bay door, in a closed position, fully or partially covers a landing gear bay in which the landing gear is stored in the stowed position. The landing gear and landing gear bay door cause aircraft drag during a take-off procedure until they reach their respective stowed and closed positions.

SUMMARY

A first aspect of the present invention provides an aircraft system for an aircraft, the aircraft system comprising a controller that is configured, during a take-off procedure, to determine that a one engine inoperative condition is met and determine that a predetermined take-off criterion is met. The controller is configured, on the basis of a determination that the one engine inoperative condition is met, and prior to receiving a command to retract a landing gear of the aircraft, to initiate automatic opening of a landing gear bay door associated with the landing gear from a closed position towards an open position when the controller determines that the predetermined take-off criterion is met and inhibit the automatic opening when the controller determines that the predetermined take-off criterion is not met.

Optionally, the predetermined take-off criterion comprises that the aircraft is operating within a certified operational domain of the aircraft. Operating within the certified operational domain is defined as when the aircraft is operating within take-off limitations that respect the Airworthiness Regulations that are in force in the jurisdiction in which the aircraft is operating.

Optionally, the predetermined take-off criterion comprises that a speed of the aircraft at a point of lift-off of the aircraft is greater than a threshold speed.

Optionally, the threshold speed is a speed that is a sum of $V_{MU}$ and a predetermined value.

Optionally, the predetermined take-off criterion comprises that a speed of the aircraft at a point of rotation of the aircraft is greater than $V_{RMIN}$. $V_{RMIN}$ is defined as the minimum allowable aircraft speed, as defined in the Airworthiness Regulations that are in force in the jurisdiction in which the aircraft is operating, for rotation of the aircraft to be initiated during the take-off procedure.

Optionally, the predetermined take-off criterion comprises that an angle of pitch of the aircraft at a point of lift-off of the aircraft is within a predetermined pitch angle range.

Optionally, the predetermined take-off criterion comprises that an aircraft-speed-to-stall-speed ratio of the aircraft is above a threshold ratio at a point of lift-off of the aircraft.

Optionally, the threshold ratio is determined based on a thrust-to-weight ratio of the aircraft during the take-off procedure.

Optionally, the controller is configured to determine that lift-off of the aircraft has occurred.

Optionally, the controller is configured to inhibit the automatic opening of the landing gear bay door until the controller determines that the lift-off of the aircraft has occurred.

Optionally, the controller is configured, in the event that the controller initiates the automatic opening of the landing gear bay door, to initiate the automatic opening within a predetermined time from the controller determining that the lift-off of the aircraft has occurred.

Optionally, the controller is configured to receive a signal indicative that the predetermined take-off criterion is met, and to initiate or inhibit the automatic opening of the landing gear bay door based on the signal received.

Optionally, the controller is configured to receive an input signal indicative of engine speeds of two or more engines comprised in the aircraft and determine that the one engine inoperative condition is met based on a difference between the engine speeds of the two or more engines.

Optionally, the controller is configured to receive an OEI signal indicative that the one engine inoperative condition is met, and to determine that the one engine inoperative condition is met based on the received OEI signal.

Optionally, the controller is configured to inhibit the automatic opening of the landing gear bay door when, during the take-off procedure, the controller determines that the one engine inoperative condition is not met.

A second aspect of the present invention provides an aircraft system for an aircraft, the aircraft system comprising a controller that is configured, during a take-off procedure, to determine that the aircraft is operating within a certified operational domain of the aircraft and determine that a door-opening criterion is met. The controller is configured, prior to receiving a command to retract a landing gear of the aircraft, to initiate automatic opening of a landing gear bay door associated with the landing gear from a closed position towards an open position, on the basis of a determination by the controller that the aircraft is operating within the certified operational domain and the door-opening criterion is met and inhibit the automatic opening on the basis of a determination by the controller that the aircraft is not operating within the certified operational domain. Operating within the certified operational domain is defined as when the aircraft is operating within take-off limitations that respect the Airworthiness Regulations that are in force in the jurisdiction in which the aircraft is operating.

Optionally, the controller is configured to determine that the aircraft is operating within the certified operational domain of the aircraft by: determining a speed of the aircraft at a point of rotation of the aircraft and comparing the determined speed to a minimum rotation speed of the aircraft, $V_{RMIN}$. $V_{RMIN}$ is defined as the minimum allowable aircraft speed, as defined in the Airworthiness Regulations that are in force in the jurisdiction in which the aircraft is operating, for rotation of the aircraft to be initiated during the take-off procedure.

Optionally, the second aspect of the present invention comprises any of the features described above with reference to the first aspect of the present invention.

Optionally, the first and second aspects of the present invention comprise the landing gear, the landing gear bay door, and a landing gear extension and retraction system configured to extend and retract the landing gear and to open and close the landing gear bay door A third aspect of the present invention provides a method of operating a controller of an aircraft system of an aircraft during a take-off procedure. The method comprises the controller determining that a predetermined take-off criterion is met and the controller determining that a one engine inoperative condition is met. The method comprises, on the basis of a determination that the one engine inoperative criterion is met, and prior to receiving a command to retract a landing gear of the aircraft, the controller initiating automatic opening of a landing gear bay door associated with the landing gear from a closed position towards an open position when it is determined that the predetermined take-off criterion is met, and the controller inhibiting the automatic opening when it is determined that the predetermined take-off criterion is not met.

A fourth aspect of the present invention provides a non-transitory computer-readable storage medium storing instructions that, if executed by a controller of an aircraft system of an aircraft, cause the controller to carry out a method according to the third aspect of the present invention.

A fifth aspect of the present invention provides an aircraft comprising an aircraft system according to the first or second aspect of the present invention or comprising a non-transitory computer-readable storage medium according to the second aspect of the present invention.

BRIEF DESCRIPTION OF THE DRAWINGS

Embodiments of the invention will now be described, by way of example only, with reference to the accompanying drawings, in which.

DETAILED DESCRIPTION

Figure 1:
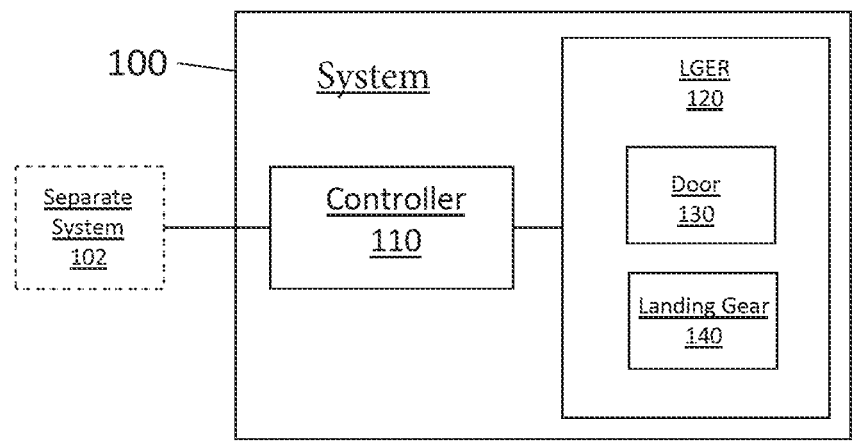
FIG. 1 shows a schematic view of an example of an aircraft system.

As discussed above, in some known aircraft, the landing gear is held in an extended position when the aircraft is on the ground and is stowed at a stowed position in a landing gear bay once the aircraft has taken off. Such stowage of the landing gear helps to reduce aircraft drag and noise and the risk of the landing gear being damaged in flight. The landing gear subsequently is extended to the extended position again before the aircraft lands. A landing gear bay door may at least partially cover the landing gear bay when closed and may be openable to enable movement of the landing gear between the stowed position and the extended position. Movement of the landing gear and the landing gear bay door is typically controlled by a pilot using cockpit flight controls of the aircraft, such as a landing gear control lever.

The take-off procedure is one of the highest workload flight phases for flight crew. Amongst the many actions they perform during this period is the retraction of the landing gear after lift-off. During a take-off procedure, the pilot will typically manually initiate a landing gear retraction procedure upon confirming a positive aircraft climb rate. Positive climb rate typically is confirmed by the pilot or another member of the flight crew looking through a window of the cockpit to check that the aircraft is ascending from the ground or checking an altimeter or vertical speed indicator for an increase in altitude. Such confirmation typically occurs at or before three seconds after lift-off.

The workload during a take-off procedure can be increased, if a fault or failure occurs in an engine of the aircraft (commonly referred to as a "one engine inoperative", or "OEI", situation). While the aircraft will have been designed so that the remaining engine(s) can generate sufficient thrust to get the aircraft airborne with an acceptable safety margin, there will nevertheless be a reduction in total thrust generated or generatable by the engine(s) of the aircraft, meaning that drag caused by the landing gear has a greater proportional effect on aircraft performance compared to an "all engines operative", or "AEO", situation.

Some examples discussed herein are concerned with automatically retracting a landing gear of an aircraft after lift-off of the aircraft in an OEI situation. In particular, some examples are concerned with determining that the lift-off of the aircraft has occurred with the aircraft operating within a particular operational domain and initiating or inhibiting automatic opening of a landing gear bay door based on the determination. Automatically opening the landing gear bay door may enable the aircraft climb rate to be increased earlier in a take-off procedure because the landing gear is retracted sooner after receipt of a command to retract the landing gear. However, the additional drag at the time of opening the landing gear bay door earlier may reduce aircraft performance when operating outside of the particular operational domain, for example when the lift-off of the aircraft is at or close to the $V_{MU}$ (the minimum unstick speed) of the aircraft. This and other advantages are achievable while maintaining that authority for retracting the landing gear can remain with the pilot or another member of the flight crew.

The technology discussed herein has application at least in civil aircraft, military aircraft, and unmanned aerial vehicles (UAVs). Some examples discussed herein are implementable within these areas of application when there is only one flight crew or no flight crew at all. The engine of the aircraft discussed herein could be any type of aircraft engine for generating thrust, such as a gas turbine engine, an electric motor, or a piston engine.

FIG. 1 shows a schematic view of an aircraft system 100 for an aircraft according to an example. The system 100 comprises a controller 110 and a landing gear extension and retraction system (LGERS) 120. The LGERS 120 comprises a landing gear bay door 130 and a landing gear 140. In other examples, one or more of the landing gear extension and retraction system 120, the landing gear bay door 130 and the landing gear 140 may be omitted from the aircraft system 100. That is, they may for example be comprised in one or more other systems with which the system 100 interacts. The landing gear bay door 130 is a door of a landing gear bay for accommodating the landing gear 140. The LGERS 120 is caused by the controller 110 to extend or retract the landing gear 140 following receipt, by the controller 110, of the command to do so. In the stowed position, the landing gear 140 is positioned in the landing gear bay. An opening of the landing gear bay is at least partially covered or blocked by the landing gear bay door 130 when the landing gear bay door 130 is in the closed position, and is uncovered by the landing gear bay door 130 when the landing gear bay door 130 is moved to an open position from the closed position. The degree of coverage of the opening is greater when the landing gear bay door 130 is at the closed position compared to at the open position. The landing gear extension and retraction system 120 is configured to extend and retract the landing gear 140 and to open and close the landing gear bay door 130.

Figure 2:
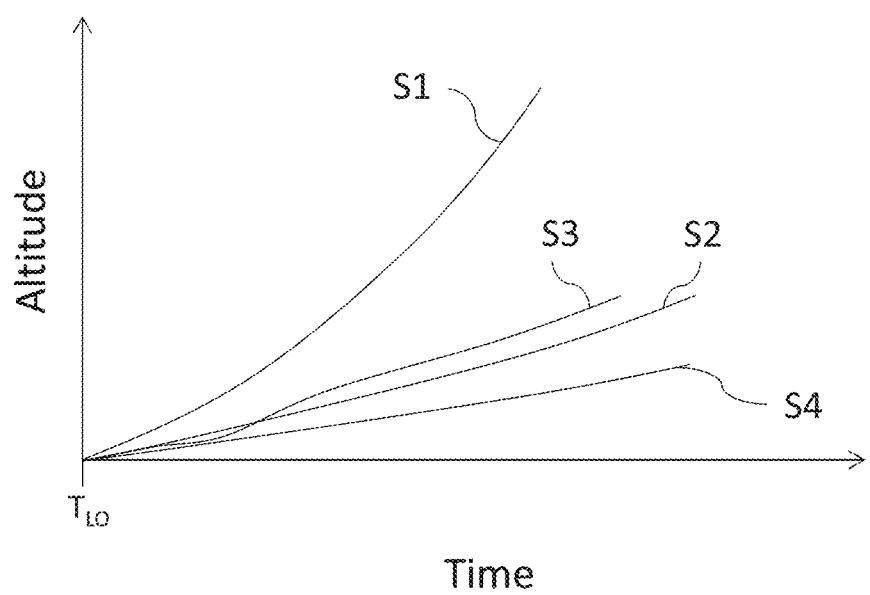
FIG. 2 shows a diagrammatic representation of aircraft trajectories during take-off procedures in different take-off scenarios.

FIG. 2 shows a diagrammatic representation of aircraft trajectories during take-off procedures in take-off scenarios S1, S2, S3 and S4. A take-off procedure is a procedure carried out between an aircraft starting a take-off acceleration on a runway and the aircraft reaching acceleration altitude after lift-off. In S1, the take-off procedure occurs with AEO and within the operational domain of the aircraft. A landing gear bay door is opened in response to receipt, at a controller, of a command to retract an associated landing gear. In S2, the take-off procedure occurs within the operational domain but with an OEI situation. The landing gear bay door is opened in response to receipt, at the controller of a command to retract the landing gear, as in S1. In S3, the take-off procedure occurs in the same conditions as in S2, but the landing gear bay door is automatically opened prior to a controller receiving a command to retract the landing gear. In S4, the take-off procedure occurs with an OEI situation and with the aircraft operating outside of a particular operational domain. The landing gear bay door is opening in response to receipt, at a controller, of a command to retract an associated landing gear.

FIG. 2 shows that a higher aircraft climb rate is achieved in S1 compared to in S2, S3 and S4. This is because, as discussed, less thrust is generatable in an OEI situation compared to an AEO situation. FIG. 2 also shows that opening the landing gear bay door prior to receiving a command to retract the landing gear (as in S3) can help the aircraft reach a given altitude sooner in an OEI situation compared to opening the landing gear bay door in response to receipt of the command to retract the landing gear (as in S2). This is because, in S3, upon subsequent receipt of the command at the controller to retract the landing gear, retraction of the landing gear can start sooner, since the landing gear bay door will be partially or fully open already. FIG. 2 also shows a slight reduction in aircraft climb rate in an initial climb phase in S3 compared to S2. This is due to the additional drag caused by opening the landing gear bay door at an earlier point in the take-off procedure in S3 compared to in S2. However, this is more than offset by the performance benefit of the landing gear reaching the stowed position at a comparatively earlier point in the take-off procedure. In S4, the aircraft climb rate is lower than in S2 and S3, and therefore the previously discussed slight reduction in aircraft climb rate caused by opening the landing gear bay door at an earlier point in the take-off procedure (as in S3 compared to in S2) may result in greater overall climb rate reduction. This may in turn result in a degraded take-off procedure, or the aircraft climb rate being lower than an acceptable amount, which may, for example, be detrimental during a take-off procedure on an obstacle-limited runway. As such, in S4 it is preferable not to automatically open the landing gear bay door before a command to retract the landing gear is received.

Referring to FIG. 1, the controller 110 is configured, during a take-off procedure, to determine that an OEI condition is met. For example, the controller 110 is configured to receive an input signal indicative of engine speeds of two or more engines comprised in the aircraft and determine that the OEI condition is met based on a difference between the engine speeds of the two or more engines. In other examples, the controller 110 determines that the OEI condition is met when the difference between the engine speeds of the aircraft engines exceeds a differential threshold for a predetermined period of time.

In other examples, the controller 110 is configured to determine that the OEI condition is met based on one or more of: a signal indicative of engine oil temperature; a signal indicative of engine oil pressure; a signal indicative of engine vibration; a signal indicative of engine thrust; a signal indicative of exhaust gas temperature; a signal indicative of an engine pressure ratio; and a signal indicative of an aircraft acceleration rate during the take-off procedure. In other examples, the controller is configured to receive a OEI signal indicative that the OEI condition is met, for example from a separate aircraft system, such as the separate aircraft system 102 shown with dashed lines in FIG. 1, and to determine that the one engine inoperative condition is met based on the received OEI signal. Other suitable ways to detect an OEI condition will be known to the skilled person.

The controller 110 is configured to determine that a predetermined take-off criterion is met. On the basis of a determination that the OEI condition is met, and prior to receiving a command to retract the landing gear 140 of the aircraft, the controller 110 is configured to initiate automatic opening of a landing gear bay door 130 associated with the landing gear 140 from a closed position towards an open position when the controller 110 determines that the predetermined take-off criterion is met, and inhibit the automatic opening when the controller 110 determines that the predetermined take-off criterion is not met. That is to say, in an OEI take-off situation, the controller 110 will initiate automatic opening of the landing gear bay door 130 when the predetermined take-off criterion is met. In some examples, when in an OEI take-off situation, the controller 110 will initiate automatic opening of the landing gear bay door 130 only when the predetermined take-off criterion is met. In this example, the controller 110 is configured to inhibit the automatic opening of the landing gear bay door 130 when, during the take-off procedure, the controller 110 determines that the OEI condition is not met.

In this example, the predetermined take-off criterion comprises that the aircraft is operating within a certified operational domain. The certified operational domain is based on one or more of: a take-off weight of the aircraft, a type of the aircraft, a configuration of the aircraft, and thrust generatable by the aircraft.

In the example of FIG. 1, the controller 110 is configured to receive a signal from a separate aircraft system 102, as discussed above, indicative that the predetermined take-off criterion is met, and to initiate or inhibit the automatic opening of the landing gear bay door 130 based on the received signal. In other examples, the controller 110 is configured to detect that the predetermined take-off criterion is met, and to initiate or inhibit the automatic opening of the landing gear bay door 130 based on the detection. In either case, the controller 110 is therefore configured to determine that the predetermined take-off criterion is met, and to initiate or inhibit the automatic opening of the landing gear bay door 130 based on the determination.

In some examples, the predetermined take-off criterion comprises that a speed of the aircraft at a point of lift-off of the aircraft is greater than a threshold speed. In some examples, the threshold speed is related to $V_{MU}$ of the aircraft. For example, the threshold speed is proportionally related to $V_{MU}$ of the aircraft, such as a particular percentage greater than $V_{MU}$ of the aircraft or a multiple of $V_{MU}$ of the aircraft. Alternatively, the threshold speed may be a speed that is a fixed amount greater than $V_{MU}$ of the aircraft, such that the threshold speed is a speed that is a sum of $V_{MU}$ and a predetermined value, for example 10 knots greater than $V_{MU}$ of the aircraft, irrespective of the magnitude of $V_{MU}$ of the aircraft.

In some examples, the predetermined take-off criterion comprises that a speed of the aircraft at a point of rotation of the aircraft is greater than a threshold speed. In some examples, the threshold speed is related to $V_{RMIN}$ of the aircraft. For example, the threshold speed is proportionally related to $V_{RMIN}$, such as a particular percentage greater than $V_{RMIN}$ or a multiple of $V_{RMIN}$. Alternatively, the threshold speed may be equal to $V_{RMIN}$ or a fixed amount greater than $V_{RMIN}$, such that the threshold speed is a speed that is a sum of $V_{RMIN}$ and a predetermined value, for example 10 knots greater than $V_{RMIN}$, irrespective of the magnitude of $V_{RMIN}$.

In some examples, the predetermined take-off criterion comprises that an angle of pitch of the aircraft at a point of lift-off of the aircraft is within a predetermined pitch angle range. The pitch of the aircraft affects the amount of lift generatable by the aircraft and therefore influences the climb rate of the aircraft. In some instances, particularly during testing, such as to determine $V_{MU}$ for an aircraft, the pitch of the aircraft may be to such an extent that the tail of the aircraft contacts the runway.

Figure 3:
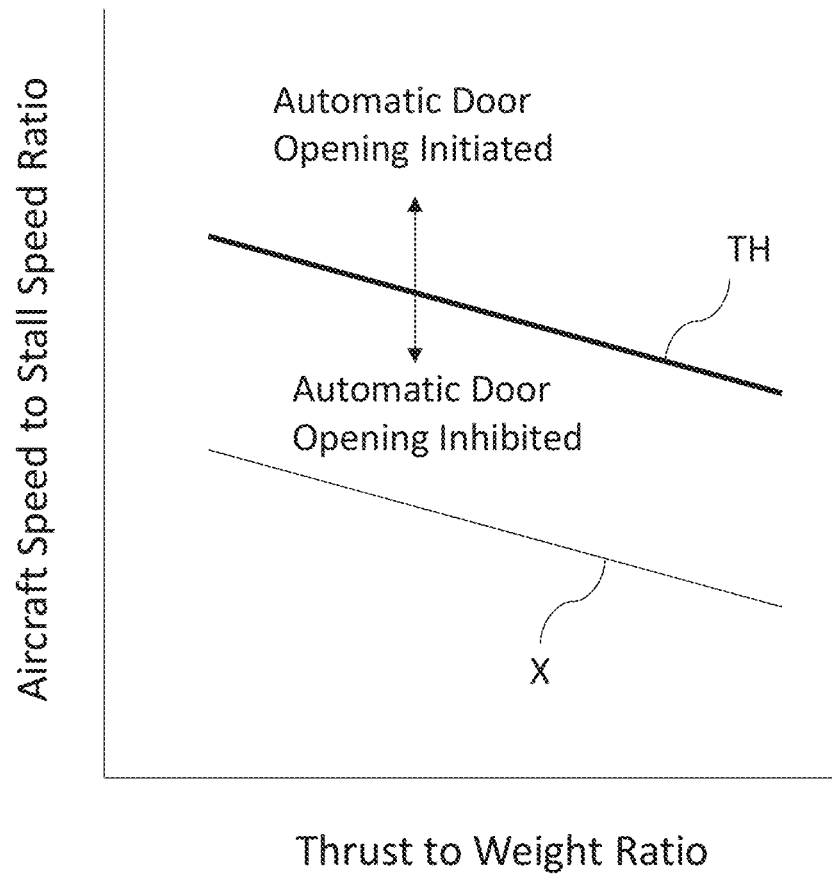
FIG. 3 shows a graph showing an aircraft-speed-to-stall-speed ratio versus a thrust-to-weight ratio of an aircraft.

FIG. 3 shows a graph that plots an aircraft-speed-to-stall-speed ratio versus a thrust-to-weight ratio of an aircraft. The aircraft speed is an instantaneous aircraft speed at the point of lift off, and the stall speed is an inherent characteristic of the aircraft. The line denoted X shows that, as the thrust-to-weight ratio increases, so the aircraft-speed-to-stall-speed ratio decreases. FIG. 3 shows a threshold line TH. In this example, the threshold line TH and the line X are parallel lines. In some examples, the predetermined take-off criterion comprises that an aircraft-speed-to-stall-speed ratio is above a threshold ratio at a point of lift-off of the aircraft. In some examples, the threshold ratio is determined based on the thrust-to-weight ratio of the aircraft during the take-off procedure. That is, if the aircraft-speed-to-stall-speed ratio is of a value that is at or above the threshold line TH of FIG. 3 at the point of lift-off, the predetermined take-off criterion is met. If the aircraft-speed-to-stall-speed ratio is of a value that is below the threshold line TH of FIG. 3 at the point of lift-off, the predetermined take-off criterion is not met.

In this example, the controller 110 is configured to determine that a lift-off of the aircraft has occurred during the take-off procedure. In some examples, the controller 110 is further configured to inhibit the automatic opening of the landing gear bay door 130 until the controller 100 determines that the lift-off of the aircraft has occurred. In some examples, a determination that lift-off has occurred is based on one or more of: aircraft speed, aircraft altitude, weight on wheels, wheel speed, landing gear strut length, aircraft rotation and aircraft angle. In some examples, the controller 110 is configured to receive signals indicative of one or more of the above variables from a separate aircraft system, such as the separate aircraft system 102. In other examples, the controller 110 is configured to receive a signal indicative that lift-off has occurred from a separate aircraft system, such as the separate aircraft system 102 discussed above.

In this example, the controller 110 is configured, in the event that the controller 110 initiates the automatic opening of the landing gear bay door 130, to initiate the automatic opening within a predetermined time from the controller 110 determining that the lift-off of the aircraft has occurred. This may ensure that the landing gear bay door 130 is in the open position, or at least between the closed position and the open position, when the command to retract the landing gear 140 is received by the controller 110, such that the landing gear reaches the stowed position earlier than if the landing gear bay door 130 were in the closed position when the command to retract the landing gear 140 was received by the controller 110. In some examples, the predetermined time is based on a time taken for the landing gear bay door 130 to move from the closed position to the open position after the controller 110 initiates the automatic opening. In some examples, the predetermined time from lift-off is based on an average time from lift-off that a command to retract the landing gear 140 is received by the controller 110. For example, the command may typically be received an average of three seconds after lift-off and the landing gear bay door 130 may take 2.5 seconds to move from the closed position to the open position, so the predetermined time from lift-off may be 0.5 seconds so that the landing gear bay door is in the open position three seconds after lift-off.

In an example, an aircraft system for an aircraft comprises a controller, such as the controller 110 shown in FIG. 1, and the controller is configured, during a take-off procedure, to determine that the aircraft is operating within a certified operational domain of the aircraft. The controller is further configured to determine that a door-opening criterion is met. Prior to receiving a command to retract a landing gear of the aircraft, the controller is configured to initiate automatic opening of a landing gear bay door associated with the landing gear from a closed position towards an open position, on the basis of a determination by the controller that the aircraft is operating within the certified operational domain and the door-opening criterion is met, and inhibit the automatic opening on the basis of a determination by the controller that the aircraft is not operating within the certified operational domain. That is, even when the door-opening criterion is met, the controller will not initiate the automatic opening of the landing gear bay door if the aircraft is not operating within the certified operational domain.

In examples, the certified operational domain is a predefined operational window within which the aircraft is permitted to be operated by an aircraft operator (or "air operator") to perform a take-off procedure, e.g. during a commercial flight or a non-revenue flight. The aircraft is able to perform take-off procedures outside of the certified operational domain during, for example, test procedures by the aircraft manufacturer's test pilots. In examples, determining that the aircraft is operating within the certified operational domain comprises determining that a predetermined take-off criterion is met, as described above. For example, determining that a speed of the aircraft at lift-off is above a threshold speed.

In examples, the door-opening criterion comprises one or more of: determination that lift-off of the aircraft has occurred and detection of an OEI situation.

Figure 4:
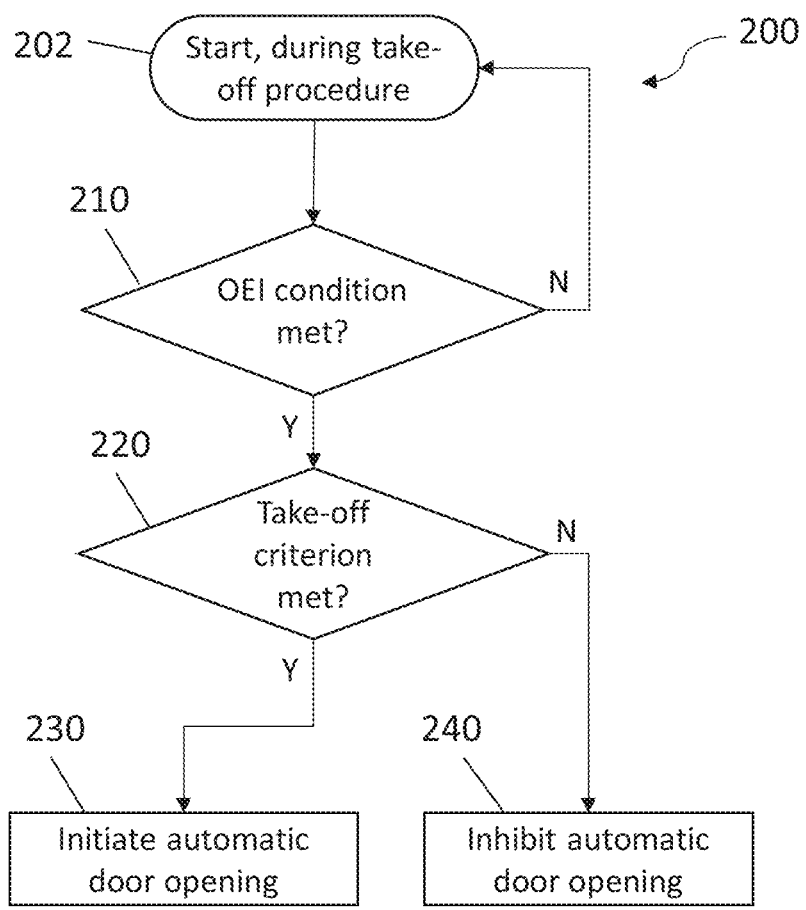
FIG. 4 shows a flow diagram showing an example of a method of operating a controller of an aircraft system of an aircraft during a take-off procedure.

There will now be described a method of operating a controller of an aircraft system of an aircraft during a take-off procedure. The aircraft system may be any aircraft system described above, such as the aircraft system 100 illustrated in FIG. 1. The controller may be the controller 110 as described in any of the examples given above. FIG. 4 shows a flow chart showing a method 200 according to an example. In other examples, one or more parts of the method 200 may be omitted.

The method 200 starts during a take-off procedure of the aircraft (as shown in start box 202), for example at the start of an acceleration down a runway.

The method 200 comprises the controller determining that an OEI condition is met (as shown in decision box 210). In this example, when the outcome of decision box 210 is negative, the method 200 returns to the start 202. In this example, when the outcome of the decision box 210 is positive, a determination is made by the controller as to whether a predetermined take-off criterion is met (as shown in decision box 220). In examples, the predetermined take-of criterion comprises one or more of: determining that lift-off has occurred, determining that a speed of the aircraft at a point of lift-off is above a threshold and determining that a pitch of the aircraft at a point of lift-off of the aircraft is within a predetermined pitch angle range.

In this example, when the outcome of decision box 220 is positive, automatic opening of the landing gear bay door is initiated by the controller (as shown in action box 230). In this example, when the outcome of decision box 220 is negative, automatic opening of the landing gear bay door is inhibited by the controller (as shown in action box 240).

In other examples, the decision boxes 210 and 220 may be performed by the controller in the opposite order or simultaneously.

In some examples (not shown), the method 200 comprises a determination by the controller as to whether lift-off of the aircraft has occurred and, when the determination that lift-off has occurred is positive and the decision boxes 210 and 220 are positive, the controller performing action box 230. The determination as to whether lift-off of the aircraft has occurred may take place before, during or after the determining whether an OEI condition is met (in decision box 210). The determination as to whether lift-off of the aircraft has occurred may take place before, during or after the determining whether a predetermined take-off criterion is met (in decision box 220).

Figure 5:
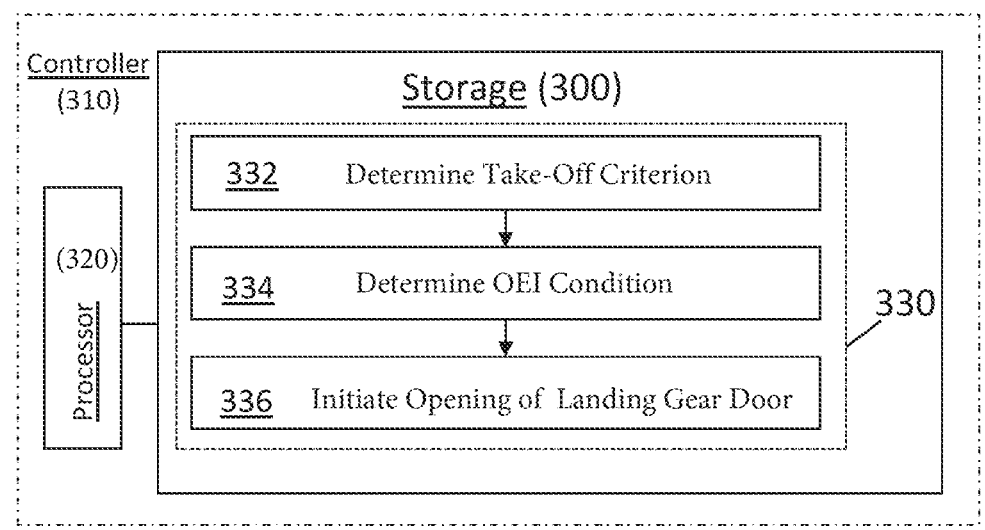
FIG. 5 shows a schematic diagram of an example of a non-transitory computer-readable storage medium.

FIG. 5 shows a schematic diagram of a non-transitory computer-readable storage medium 300 according to an example. The non-transitory computer-readable storage medium 300 stores instructions 330 that, if executed by a processor 320 of a controller 310, cause the processor 320 to perform a method according to an example. In some examples, the controller 310 is the controller 110 as described above with reference to FIG. 1 or any variation thereof discussed herein. The instructions 330 comprise: determining 332 that a predetermined take-off criterion is met, determining 334 that a OEI condition is met, and then, on the basis of a determination that the OEI condition is met and, prior to receiving a command to retract a landing gear, initiating 336 automatic opening of a landing gear bay door associated with the landing gear from a closed position towards an open position when it is determined that the predetermined take-off criterion is met and inhibiting the automatic opening when it is determined that the predetermined take-off criterion is not met. In other examples, the instructions 330 comprise instructions to perform any other example method described herein, such as the method 200 described above with reference to FIG. 4.

Figure 6:
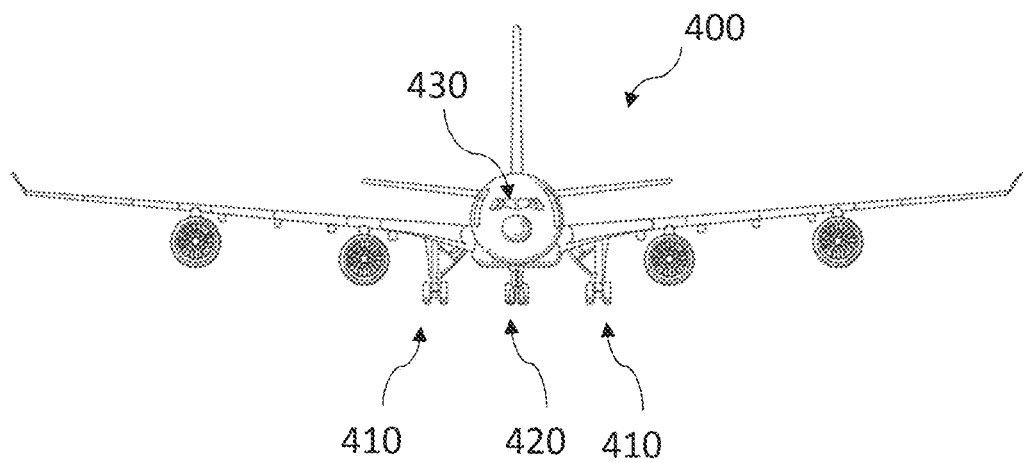
FIG. 6 shows schematic front view of an example of an aircraft.

FIG. 6 shows a schematic diagram of an aircraft 400 in accordance with an example. In this example, the aircraft 400 comprises two main landing gears 410 and a nose landing gear 420, and landing gear bay doors (now shown) each associated with a respective landing gear 410, 420. The aircraft 400 also comprises the non-transitory computer-readable storage medium 300 (not shown) discussed above with reference to FIG. 5. The aircraft 400 also comprises an aircraft system (not shown), such as an aircraft system 100 as described in any of the examples above with reference to FIG. 1. In this example, the aircraft system 100 comprises a plurality of landing gear extension and retraction systems 120, each associated with a respective landing gear 410, 420 of the aircraft 400. The aircraft 400 also has a cockpit 430 from where the command to retract the landing gear is received by a controller 110 of the aircraft system 100, as discussed above.

It is to be noted that the term "or" as used herein is to be interpreted to mean "and/or", unless expressly stated otherwise.

The above examples are to be understood as non-limiting illustrative examples of how the present invention, and aspects of the present invention, may be implemented. Further examples of the present invention are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the present invention, which is defined in the accompanying claims.

The invention claimed is:

1. An aircraft system for an aircraft, the aircraft system comprising a controller that is configured, during a take-off procedure, to:
   determine that a one engine inoperative condition is met;
   determine that a predetermined take-off criterion is met; and
   on the basis of the determination that the one engine inoperative condition is met, and prior to receiving a command to retract a landing gear of the aircraft:
      initiate automatic opening of a landing gear bay door associated with the landing gear from a closed position towards an open position when the determination is made by the controller that the predetermined take-off criterion is met, and
      inhibit the automatic opening when the determination is made by the controller that the predetermined take-off criterion is not met.

2. The aircraft system according to claim 1, wherein the predetermined take-off criterion comprises that the aircraft is operating within a certified operational domain of the aircraft.

3. The aircraft system according to claim 1, wherein the predetermined take-off criterion comprises that a speed of the aircraft at a point of lift-off of the aircraft is greater than a threshold speed.

4. The aircraft system according to claim 3, wherein the threshold speed is a speed that is a sum of a Minimum Unstick Speed ($V_{MU}$) and a predetermined value.

5. The aircraft system according to claim 1, wherein the predetermined take-off criterion comprises that a speed of the aircraft at a point of rotation of the aircraft is greater than a Minimum Rotation Speed ($V_{RMIN}$).

6. The aircraft system according to claim 1, wherein the predetermined take-off criterion comprises that an angle of pitch of the aircraft at a point of lift-off of the aircraft is within a predetermined pitch angle range.

7. The aircraft system according to claim 1, wherein the predetermined take-off criterion comprises that an aircraft-speed-to-stall-speed ratio of the aircraft is above a threshold ratio at a point of lift-off of the aircraft.

8. The aircraft system according to claim 7, wherein the threshold ratio is determined based on a thrust-to-weight ratio of the aircraft during the take-off procedure.

9. The aircraft system according to claim 1, wherein the controller is configured to determine that lift-off of the aircraft has occurred.

10. The aircraft system according to claim 9, wherein the controller is configured to inhibit the automatic opening of the landing gear bay door until the controller determines that the lift-off of the aircraft has occurred.

11. The aircraft system according to claim 9, wherein the controller is configured, in the event that the controller initiates the automatic opening of the landing gear bay door, to initiate the automatic opening within a predetermined time from the controller determining that the lift-off of the aircraft has occurred.

12. The aircraft system according to claim 1, wherein the controller is configured to receive a signal indicative that the predetermined take-off criterion is met, and to initiate or inhibit the automatic opening of the landing gear bay door based on the signal received.

13. The aircraft system according to claim 1, wherein the controller is configured to:
receive an input signal indicative of engine speeds of two or more engines comprised in the aircraft; and
determine that the one engine inoperative condition is met based on a difference between the engine speeds of the two or more engines.

14. The aircraft system according to claim 1, wherein the controller is configured to receive a One Engine Inoperative (OEI) signal indicative that the one engine inoperative condition is met, and to determine that the one engine inoperative condition is met based on the received OEI signal.

15. The aircraft system according to claim 1, wherein the controller is configured to inhibit the automatic opening of the landing gear bay door when, during the take-off procedure, the controller determines that the one engine inoperative condition is not met.

16. An aircraft system for an aircraft, the aircraft system comprising a controller that is configured, during a take-off procedure, to:
determine whether the aircraft is operating within a certified operational domain of the aircraft;
determine whether a door-opening criterion is met; and
prior to receiving a command to retract a landing gear of the aircraft:
initiate automatic opening of a landing gear bay door associated with the landing gear from a closed position towards an open position, based on the determinations by the controller that the aircraft is operating within the certified operational domain and the door-opening criterion is met; and
inhibit the automatic opening based on the determination by the controller that the aircraft is not operating within the certified operational domain.

17. An aircraft system according to claim 1, comprising:
the landing gear;
the landing gear bay door; and
a landing gear extension and retraction system configured to extend and retract the landing gear and to open and close the landing gear bay door.

18. A method of operating a controller of an aircraft system of an aircraft during a take-off procedure, the method comprising:
the controller determining that a predetermined take-off criterion is met;
the controller determining that a one engine inoperative condition is met; and
on the basis of the determination that the one engine inoperative criterion is met, and prior to receiving a command to retract a landing gear of the aircraft:
the controller initiating automatic opening of a landing gear bay door associated with the landing gear from a closed position towards an open position when the determination is made by the controller that the predetermined take-off criterion is met, and
the controller inhibiting the automatic opening when the determination is made by the controller that the predetermined take-off criterion is not met.

19. A non-transitory computer-readable storage medium storing instructions that, if executed by a controller of an aircraft system of an aircraft, cause the controller to carry out the method according to claim 18.

20. An aircraft comprising the aircraft system according to claim 1.

* * * * *